(12) United States Patent
Hashimoto et al.

(10) Patent No.: US 7,741,972 B2
(45) Date of Patent: Jun. 22, 2010

(54) METAL-SUITABLE RFID TAG AND RFID TAG UNIT THEREFOR

(75) Inventors: Shigeru Hashimoto, Inagi (JP);
Yoshiyasu Sugimura, Inagi (JP);
Hiroshi Kawamata, Inagi (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 0 days.

(21) Appl. No.: 11/865,241

(22) Filed: Oct. 1, 2007

(65) Prior Publication Data

US 2008/0018479 A1 Jan. 24, 2008

Related U.S. Application Data

(63) Continuation of application No. PCT/JP2005/006491, filed on Apr. 1, 2005.

(51) Int. Cl.
*G08B 13/14* (2006.01)
(52) U.S. Cl. ............. 340/572.1; 340/568.1; 340/539.11
(58) Field of Classification Search ... 340/572.1–572.9, 340/568.1, 825.54, 539.11, 547, 539.1
See application file for complete search history.

(56) References Cited

U.S. PATENT DOCUMENTS

| 4,331,957 | A | | 5/1982 | Enander et al. |
| 6,100,804 | A | * | 8/2000 | Brady et al. ............. 340/572.7 |
| 6,121,878 | A | * | 9/2000 | Brady et al. ............. 340/572.1 |
| 6,147,606 | A | * | 11/2000 | Duan ...................... 340/572.7 |
| 6,259,408 | B1 | * | 7/2001 | Brady et al. .......... 343/700 MS |
| 6,455,880 | B1 | * | 9/2002 | Ono et al. .................... 257/275 |
| 6,535,175 | B2 | * | 3/2003 | Brady et al. ................. 343/795 |
| 2002/0003496 | A1 | | 1/2002 | Brady et al. |

FOREIGN PATENT DOCUMENTS

| JP | 11-242786 A | 9/1999 |
| JP | 2001-068916 A | 3/2001 |
| JP | 2001-160124 A | 6/2001 |
| JP | 2002-298106 A | 10/2002 |
| JP | 2003-271913 A | 9/2003 |

(Continued)

OTHER PUBLICATIONS

International Search Report of PCT/JP2005/006491, date of mailing Aug. 2, 2005.

(Continued)

*Primary Examiner*—Daniel Previl
(74) *Attorney, Agent, or Firm*—Westerman, Hattori, Daniels & Adrian, LLP (57) ABSTRACT

An RFID tag unit is constituted of a seal member part, a substrate material part layered on the seal member part, and a print member part layered on the substrate material part. An RFID tag that comprises an LSI chip, an antenna and an impedance adjustment part is formed on the surface of the substrate material part. Of the seal member part and substrate material part, a part positioned under the impedance adjustment part is cut off, and an impedance adjustment part cutoff part is equipped in the cutoff area. Cutting the impedance adjustment part cutoff part off the RFID tag unit cuts the impedance adjustment part, which has been connected to the antenna, from the RFID tag.

14 Claims, 8 Drawing Sheets

FOREIGN PATENT DOCUMENTS

| | | | |
|---|---|---|---|
| JP | 2004-104344 A | 4/2004 | |
| JP | 2004-510190 A | 4/2004 | |
| JP | 2005-070855 A | 3/2005 | |
| WO | 02-25584 A1 | 3/2002 | |
| WO | WO 02/25584 | * | 3/2002 |
| WO | WO 02/25584 A | 3/2002 | |
| WO | WO 03/009007 A | 1/2003 | |
| WO | WO 03/009007 A2 | 1/2003 | |
| WO | WO 2004/093243 A | 10/2004 | |
| WO | WO 2004/093243 A2 | 10/2004 | |

OTHER PUBLICATIONS

European Search Report dated Nov. 13, 2008 in corresponding European Patent Application No. 05727273.4.

European Office Action dated Feb. 13, 2009, Application No. 05 727 273.4-1248.

Korean Office Action dated Aug. 31, 2009, issued in corresponding Korean patent application No. 10-2007-7021308.

European Office Action dated Oct. 28, 2009, issued in corresponding European patent application No. 05 727 273.4.

Japanese Office Action (Notice of Rejection Grounds) dated Feb. 9, 2010, issued in corresponding Japanese patent application No. 2007-514344.

Korean office action dated Mar. 2, 2010, issued in corresponding Korean patent application No. 10-2007-7021308 (partial translation).

* cited by examiner

METAL-SUITABLE RFID TAG AND RFID TAG UNIT THEREFOR

CROSS-REFERENCE TO RELATED APPLICATION

This application is a continuation of PCT application of PCT/JP2005/06491, which was field Apr. 1, 2005.

BACKGROUND OF THE INVENTION

1. Field of the Invention

The present invention relates to a metal-suitable RFID tag and an RFID tag unit, and in particular to an RFID tag unit separable from a metal-suitable RFID tag and allowing a printing and issuing, and to a metal-suitable RFID tag comprising the aforementioned RFID tag unit.

2. Description of the Related Art

Currently there is an increasing interest in Radio Frequency Identification (RFID) tags. The RFID tag is a type of a wireless integrated circuit (IC) tag, and is constituted of components including a large scale integrated circuit (LSI) chip, an antenna, and an external resin for molding the aforementioned components. The external size of an RFID tag varies widely, e.g., from 0.3 mm (the size of a sesame seed) to 20 to 30 mm (the size of a coin) in diameter, the size of an IC card. Also, there is a battery built-in type and there is a non battery built-in type. The former is called an active type tag and the latter is called a passive type tag.

An LSI chip built in the RFID tag comprises an antenna, a transmission/reception unit, a control unit and a memory. The memory stores a specific identification code (i.e., a unique ID) which is read by an RFID tag-use reader/writer (simply noted as "reader/writer" hereinafter). The readout of the unique ID of the RFID tag by the reader/writer is carried out by a radio communication via an RFID tag-use antenna (simply noted as "antenna" hereinafter). The radio communication employs a radio wave method or an electromagnetic induction method.

The characteristics of an RFID tag are usually greatly altered when it is attached to a metal. As an example, in the case of an RFID tag of the electromagnetic induction method, an eddy current flows when a magnetic flux enters a metal so that the eddy current acts in negating the magnetic flux. As a result, the communication range is greatly decreased, and, in the worst case, communicating becomes impossible. In such a case, an impact of a metal is eliminated if the attaching position of the RFID tag is separated from the metal by a certain distance.

Meanwhile, in the case of an RFID tag of the radio wave method, a multi-pass phenomenon is generated as a result of a radio wave reflecting on a metal surface. The multi-pass phenomenon causes readout of information stored in the RFID tag to be unstable and a degradation of a power conversion efficiency of the antenna of the RFID tag, thereby degrading a communication ranges as in the case of the electromagnetic induction method.

Also in this case, an influence of a metal can be mitigated if the attaching position of the RFID tag is separated from the metal by a certain distance.

In the cases of a commercial products or other products, many are made from metallic materials. Therefore, there is metal-suitable RFID tag that can be put on the metal, and it has already been commercialized.

The metal-suitable RFID tag is configured to attach to a metal by keeping the antenna (i.e., the RFID tag antenna) clear of the metal in a suitable distance or sandwiching an RF absorption material between the RFID tag and the metal.

Figure 1:
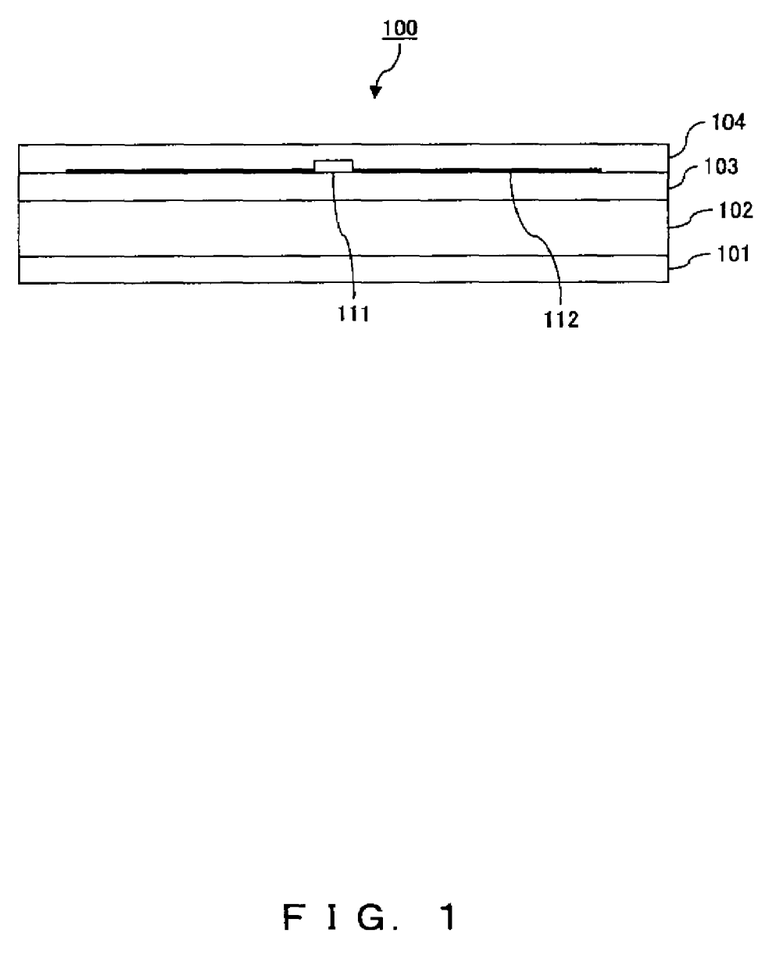
FIG. 1 is a vertical cross-section diagram showing a composition of a conventional metal-suitable RFID tag.

FIG. 1 is a vertical cross-section diagram showing a composition of a conventional metal-suitable RFID tag 100.

The metal-suitable REID tag 100 shown in FIG. 1 is configured so as to layer a metal reflection plate 101, a spacer 102, a substrate material part 103 and a PET(polyethylene terephthalate) material 104 in the aforementioned order.

The substrate material part 103 is incorporated with an RFID tag which is equipped with an LSI chip 111 at the approximate center thereof and an antenna (i.e., RFID tag antennas) 112 on both side surfaces. The RFID tag is constituted of the LSI chip 111 and antenna 112. The LSI chip 111 is integrated with a control part, a transmission/reception part, a memory and such. A dipole antenna is widely used as the antenna 112.

The metal reflection plate 101, being a thin plate attached to a metal via an adhesive (not shown in a drawing herein), reflects an RF reflected on the aforementioned metal. The spacer part 102, comprising a dielectric body and a Styrofoam, plastic or such, is for keeping enough space between the metal, to which the metal-suitable RFID tag 100 is attached, and the antenna 112 incorporated in the substrate material part 103. For example, a material having the function as an RF absorption member is used as a material for the space part 102.

The conventional metal-suitable RFID tag 100 as configured above needs to increase the thickness of the spacer part 102, therefore the thickness of the metal-suitable RFID tag 100 increase in size as a result, its handling is difficult and its usage is limited. Further it is bulky and poorly flexible, hence precluding a printing/issuing by using a label printer (i.e., an RFID tag-use label printer).

Here, an "issuing" means the process of writing data to an RFID tag (including a metal-suitable RFID tag) and of printing. Also an RFID tag-use label printer has a built-in reader/writer function and is capable of writing data to an RFID tag and printing it.

The conventional metal-suitable RFID tag requires a writing of specific data individually by using a reader/writer due to the above described reasons. A printing on the metal-suitable RFID tag is limited to a printing in a lump at the production thereof or attaching a printed label thereto.

Incidentally, a known invention similar to the present invention is a composite body installable to a metallic body by using a pressure sensitive resin material after forming a composite body comprising a layer including an RFID and a layer which is formed on the aforementioned layer and which has a printable surface and printing a surface of the composite body (refer to a reference patent document 1).

Another known invention is a data carrier which employs either an electromagnetic induction method or a microwave method and which is directly mountable onto a metal surface; and a data carrier-use adaptor which integrates an upper layer constituted of a ferrite layer and a lower layer comprised of a good conductive metal layer and which is mountable onto a metal by attaching onto the back of the data carrier (refer to a reference patent document 2).

Yet another known invention is a method capable of adjusting a tuning frequency of a data carrier by attaching a metallic seal of a prescribed size to a prescribed position of a coil operating synchronously with a predetermined frequency (refer to a reference patent document 3).

Yet another known invention is a noncontact type data carrier comprising an IC chip and an antenna, in which a resonance frequency of a resonance circuit is adjustable. The noncontact type data carrier is configured to suppress a variation of a resonance frequency caused by a variation of capacitance of an IC chip constituting a resonance circuit of the data carrier by adjusting inductance of the antenna that is a part of the components constituting the resonance circuit. The specific composition is to adjust the inductance of the antenna by placing components, such as a closed loop antenna, a conductor (such as a metal) and a separate resonance circuit near the antenna (refer to a reference patent document 4).

Patent document 1: Japanese Unexamined Patent Application Publication Translations of PCT Application No. 2004-510190

Patent document 2: Laid-Open Japanese Patent Application Publication No. 2001-68916

Patent document 3: Laid-Open Japanese Patent Application Publication No. 2003-271913

Patent document 4: Laid-Open Japanese Patent Application Publication No. 2001-160124

SUMMARY OF THE INVENTION

A purpose of the present invention is to accomplish a metal-suitable RFID tag allowing a printing and issuing by using an RFID tag-use label printer. Another purpose is to enable an RFID tag unit of the metal-suitable RFID tag to be easily used as a nonmetallic goods-use RFID tag.

An RFID tag unit according to the present invention comprises a substrate, an RFID tag formed on the substrate material, a print body part layered on the substrate material and a seal part formed on the back of the substrate material and is comprised of the metal-suitable RFID tag in which an impedance adjustment part is connected to an antenna of the RFID tag.

The RFID tag unit according to the present invention comprises an impedance adjustment part cutoff part allowing a cutoff of the impedance adjustment part.

The impedance adjustment part may be configured such that the impedance adjustment part cutoff part is equipped in the substrate material and the seal part.

The impedance adjustment part cutoff part may be configured to be formed with perforations for example (i.e., a first embodiment). The impedance adjustment part cutoff part may also be configured to comprise a seal part equipped under the impedance adjustment part for example (i.e., a second embodiment).

The impedance adjustment part according to the second embodiment may be configured to be equipped in an area cut off the substrate material for example. In such a composition, the seal part may be configured to comprise a sub-seal member equipped under the impedance adjustment part and to comprise a main seal member which is equipped under the sub-seal member and which comes into contact with the sub-seal member, for example.

The sub-seal member may be configured to come into contact with the substrate material for example.

A composition may be such that a first adhesive member is formed in a layer featuring the sub-seal member. In such a composition, it may be configured such that, for example, the sub-seal member according to the second embodiment is formed so as not to contact with the first adhesive member, the main seal member is formed so as to contact with the first adhesive member, and a second adhesive member is formed between the sub-seal member and the substrate material.

The RFID tag unit according to the present invention is constructed to make the thickness of it small, enabling a printing and issuing by using an RFID tag-use label printer, thereby enabling an improvement in work efficiency of printing and issuing the RFID tag unit. It is also constructed to cut off the impedance adjustment part cutoff part, thereby making it possible to use separately for an RFID tag of nonmetallic goods.

The metal-suitable RFID tag according to the present invention comprises an RFID tag unit according to any of claims 1 through 9; and a metal sheet part which comprises a spacer part and a metal reflection part and which is formed on the back of the RFID tag unit.

The metal-suitable RFID tag according to the present invention is constructed to print and issue the RFID tag unit of the present invention by using the RFID tag-use label printer, attaching the RFID tag unit to the metal sheet part, thereby making it possible to produce the metal-suitable RFID tag in good process efficiency.

BRIEF DESCRIPTION OF THE DRAWINGS

FIG. 3A to 3C are diagrams showing a composition of the RFID tag unit shown in FIG. 2.

DESCRIPTION OF THE PREFERRED EMBODIMENTS

The following is a description of the preferred embodiment of the present invention by referring to the accompanying drawings.

Figure 2:
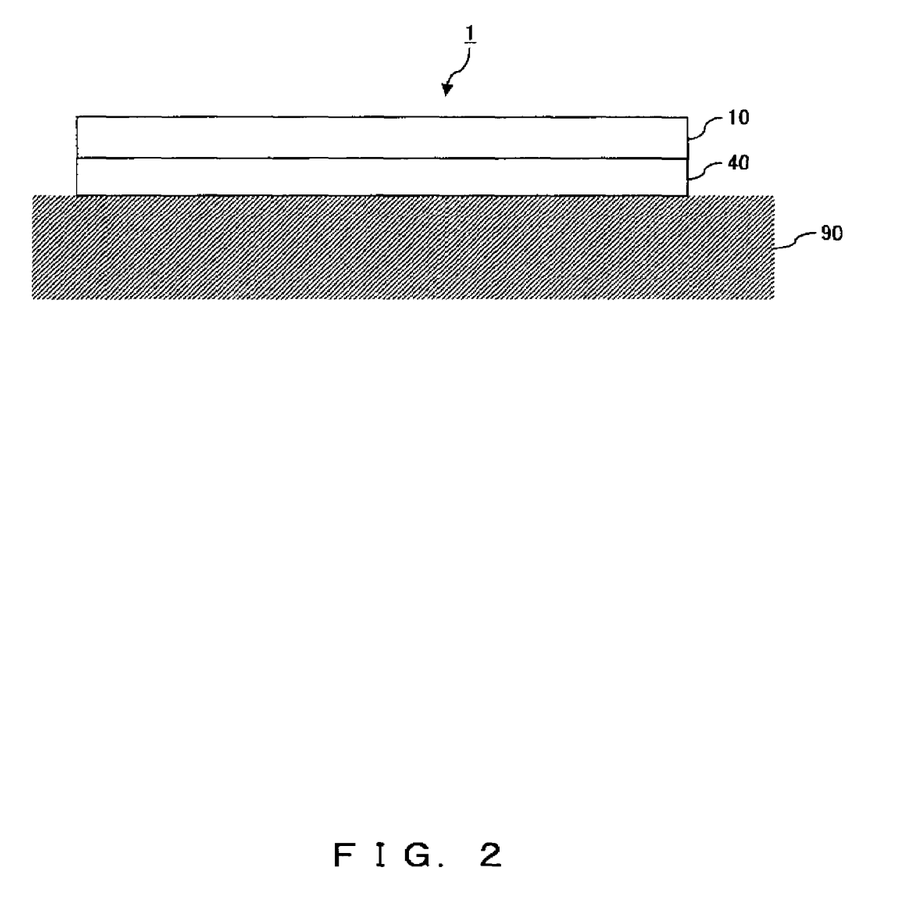
FIG. 2 is a diagram showing an overall composition of a metal-suitable RFID tag according to a preferred embodiment of the present invention.

FIG. 2 is a diagram showing an overall composition of a metal-suitable RFID tag according to a preferred embodiment of the present invention.

The metal-suitable RFID tag 1 according to the present embodiment comprises a metal sheet part 40 and an RFID tag unit 10 equipped on the metal sheet part 40 as shown in FIG. 2.

The RFID tag unit 10 comprises a common RFID tag used for nonmetallic goods or such, and an impedance adjustment part for adjusting a tuning frequency of an antenna of the RFID tag. The RFID tag unit 10 can also be used as a single body by attaching it to nonmetallic goods. When using the RFID tag unit 10 as a single body for nonmetallic goods, the impedance adjustment part is preferably eliminated. The reason is that a tuning performance is reduced by an existence of the impedance adjustment part because the RFID tag unit 10 is produced in a premise of an attachment to a metallic surface.

The metal sheet part 40 is used by attaching the RFID tag unit 10 onto a metal, and comprises a spacer part for preventing the RFID tag unit 10 from an influence of a metal and a metal reflection plate for attaching the metal-suitable RFID tag 1 constituted of the RFID tag unit 10 and metal sheet part 40.

As shown in FIG. 2, when using the metal-suitable RFID tag 1 by attaching it to a metal 90, the metal-suitable RFID tag 1 is attached to the metal 90 via the back side of the metal sheet part 40.

Figure 3A:
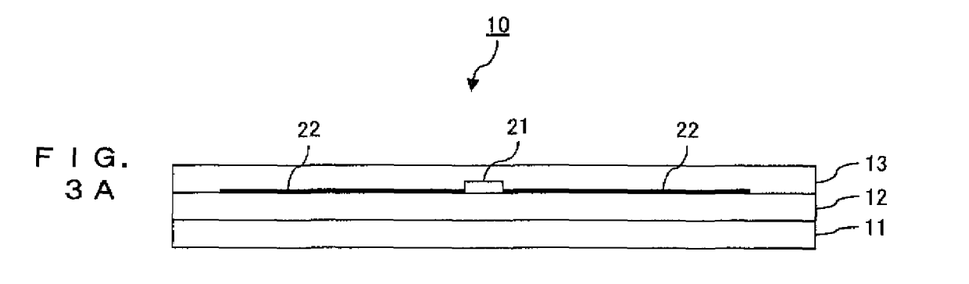
FIG. 3A shows a vertical cross-section diagram of the RFID tag unit.
Figure 3B:
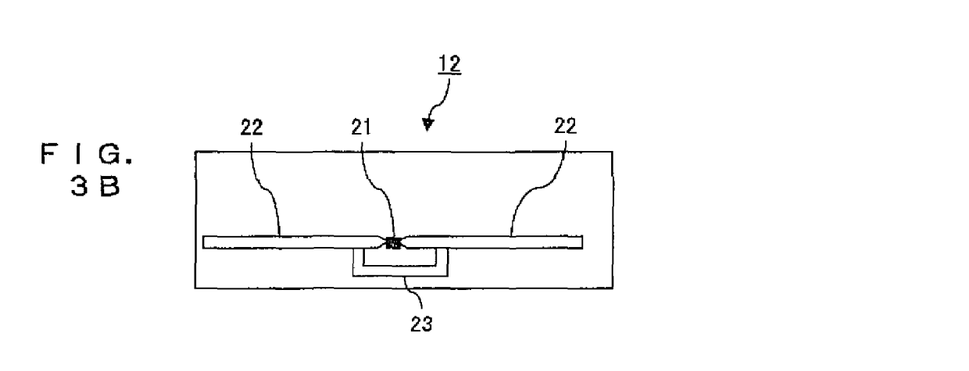
FIG. 3B shows a top view of a substrate material part.
Figure 3C:
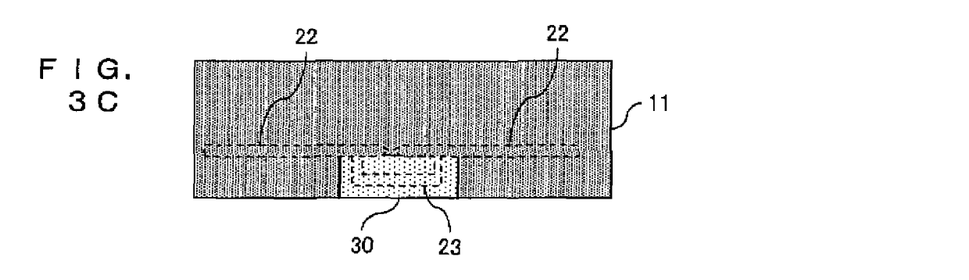
FIG. 3C shows a rear view of a seal member part of FIG. 3A.

FIG. 3A to 3C are diagrams showing a composition of the RFID tag unit 10 shown in FIG. 2. FIG. 3A shows a vertical cross-section diagram of the RFID tag unit 10; FIG. 3B shows a top view of a substrate material part 12 shown in FIG. 3A; and FIG. 3C shows a rear view of a seal member part 11 shown in FIG. 3A.

The RFID tag unit 10 is constituted of the seal member part (i.e., a seal part) 11, substrate material part (i.e., substrate material) 12 and print member part (i.e., a print part) 13 as shown in FIG. 3A. The seal member part 11, substrate material part 12 and print member part 13 are layered together, with the first layer (i.e., the bottom layer) being the seal member part 11, the second layer (i.e., the middle layer) being the substrate material part 12 and the third layer (i.e., the top layer) being the print member part 13.

The seal member part 11 is a seal possessing adhesiveness for adhering the RFID tag unit 10 onto the metal sheet part 40. The substrate material part 12 consists of polyethylene terephthalate (PET) material and paper and so on and in the surface, RFID tag and an impedance adjustment part are formed. The print member part 13 consists of paper, thermal paper, PET material and is printable by label printer or such.

The top surface of the substrate material part 12 is formed with the RFID tag as shown in FIGS. 3A and 3B. The RFID tag is constituted of an LSI chip 21, an antenna 22 and an impedance adjustment part 23 as shown in FIG. 3B.

The LSI chip 21 is formed approximately at the center of the surface of the substrate material part 12. The antenna 22 is a dipole antenna and is formed on both sides of the LSI chip 21. The antenna 22 is formed by etching, paste printing or such to the surface of the substrate material part 12. The impedance adjustment part 23 is a conductor and is equipped for adjusting an impedance characteristic of the antenna 22. The impedance adjustment part 23 may alternatively be equipped internally to the substrate material part 12, not in place of the surface thereof. Note that although the present embodiment is configured to use a dipole antenna as the antenna 22, another antenna type may also be applied.

If the metal-suitable RFID tag 1 supports radio waves of a high frequency wave band such as UHF band, the impedance component can be formed by a conductor in a loop form. Consequently, the impedance adjustment part 23 is connected to antennas 22 on the left and right and formed into a "box with one open vertical side".

The present embodiment is configured to form the impedance adjustment part 23 into a loop-formed conductor in a box-shape with one open vertical side; the form may be other than that, however, provided that it is loop-formed.

Also, an impedance adjustment part cutoff part 30 is provided for the place which is opposite to the above the impedance adjustment part 23 in the seal member part 11 as shown in FIG. 3C. The impedance adjustment part cutoff part 30 is equipped for cutting off the impedance adjustment part 23 of the RFID tag unit 10 when the metal-suitable RFID tag 1 is used as a single body. Note that the antennas 22 formed on the front surface of the substrate material part 12 and the impedance adjustment part 23 formed on the front surface or in the inside of the substrate material part 12 are shown by dotted lines in the description in FIG. 3C.

The metal-suitable RFID tag 1 is configured so as to bring out a maximum performance when it is attached to a metal and therefore the performance is degraded to some extent when the metal-suitable RFID tag 1 is used as a single body.

Because of this, when using the metal-suitable RFID tag 1 separately, the impedance adjustment part 23 is cut off from the RFID tag unit 10 at the impedance adjustment part cutoff part 30 before the usage. Cutting off the impedance adjustment part 23 of the RFID tag unit 10 enables the metal-suitable RFID tag 1 to bring out a maximum performance when it is separately used.

Figure 4:
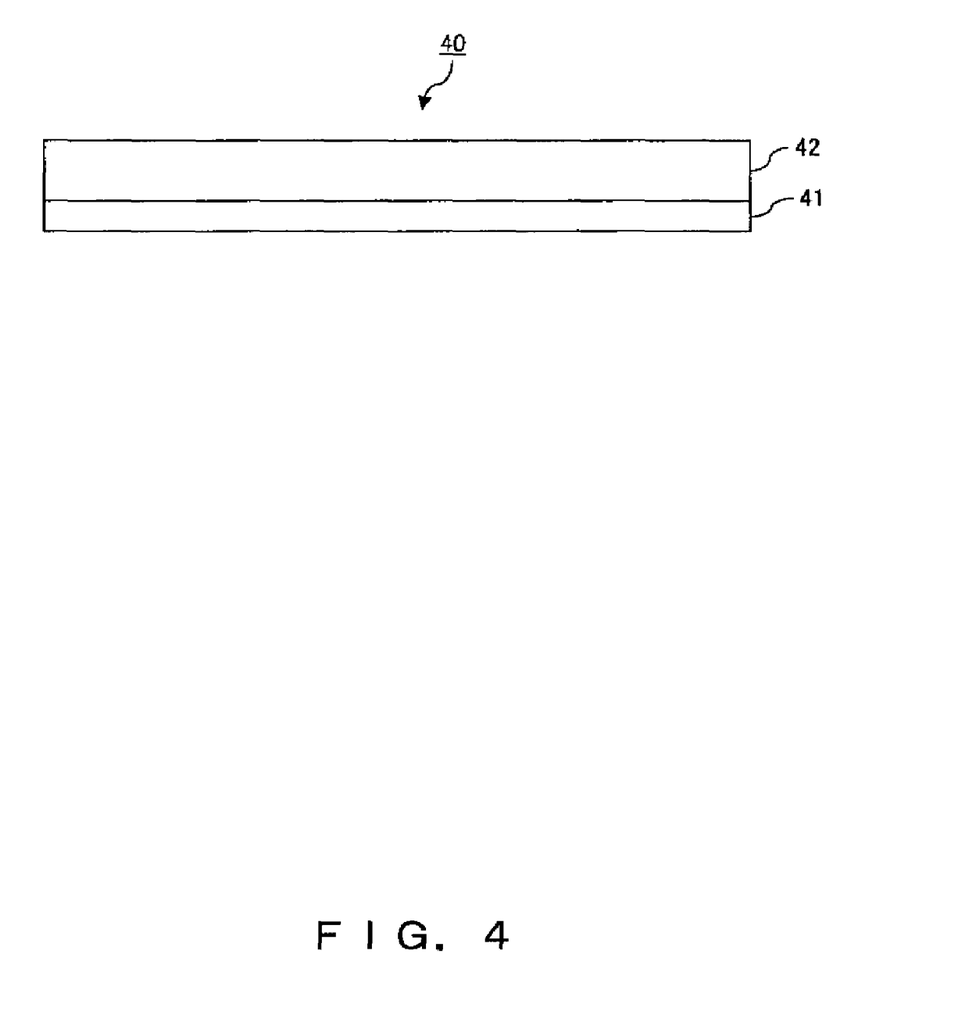
FIG. 4 is an overall composition diagram of a metal sheet part shown in FIG. 2.

FIG. 4 is an overall composition diagram of the metal sheet part 40 shown in FIG. 2.

The metal sheet part 40 is constituted of a metal reflection plate 41 and a spacer part 42 as shown in FIG. 4. The metal reflection plate 41 is made of a thin plate or such. The spacer part 42 is made of a high dielectric body, polystyrene foam, plastic or such. If a high dielectric body is used as the spacer part 42, a high performance metal-suitable RFID tag 1 can be produced in a thickness no larger than one millimeter even for a metal-suitable RFID tag.

The next is a description of a preferred embodiment of the RFID tag unit 10 according to the present embodiment.

EMBODIMENT 1

Figure 5A:
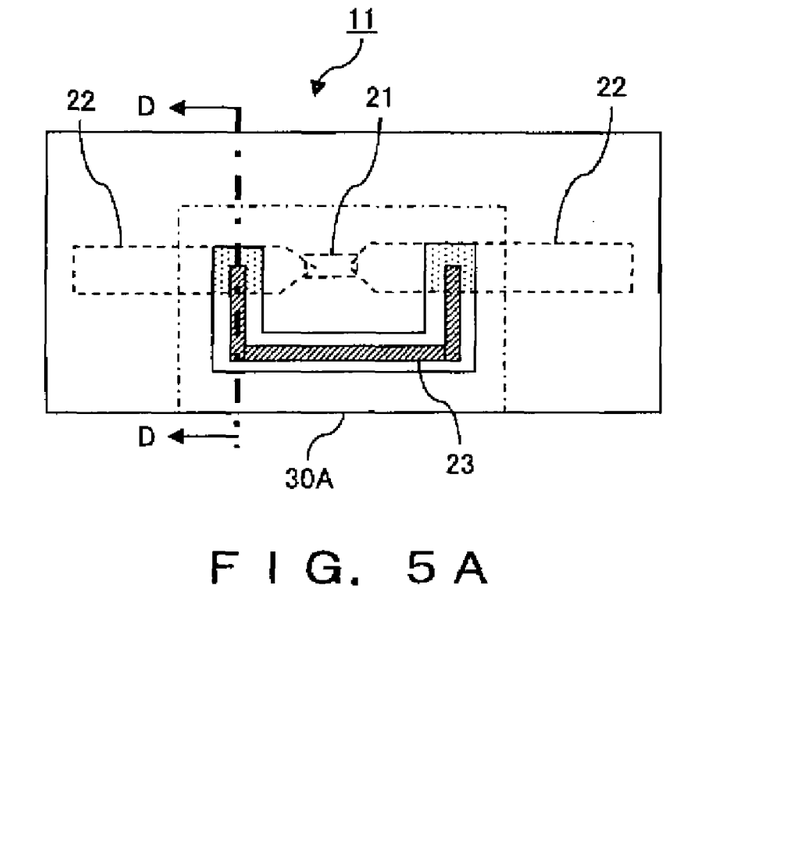
FIGS. 5A and 5B are diagrams showing a first preferred embodiment (i.e., embodiment 1) of a comprisal for cutting off an impedance adjustment part cutoff part.
Figure 5B:
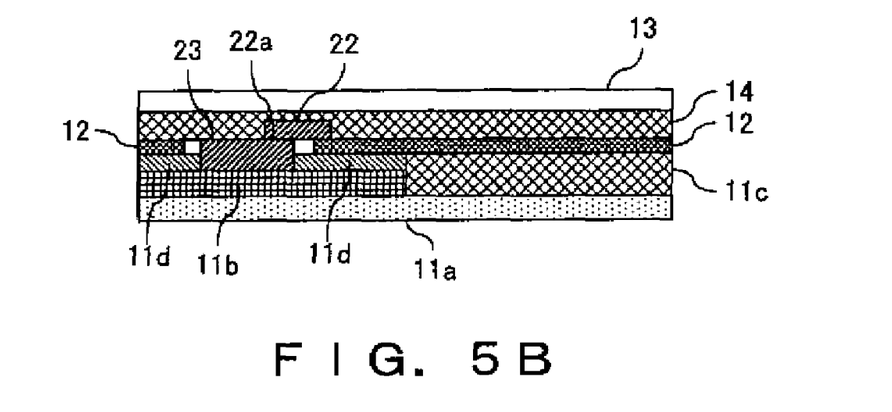

FIGS. 5A and 5B are diagrams showing a composition of an RFID tag unit 10 according to a first preferred embodiment (i.e., embodiment 1) comprising the impedance adjustment part cutoff part 30.

FIG. 5A shows a top view of the RFID tag unit 10 according to the first embodiment; and FIG. 5B is the diagram showing the cross-section D-D of FIG. 5A.

The RFID tag unit 10 according to the first embodiment is configured to pre-cut out a lower part of a substrate material part 12 in which a part of an antenna 22 (i.e., the place where the antenna 22 and the impedance adjustment part 23 overlap with each other) is formed as shown in FIG. 5B. Therefore the composition is such that a part of metal surface of the antenna 22, which is formed on the substrate material part 12, is exposed. Further the impedance adjustment part 23 is equipped in the cut-out area of the substrate material part 12.

Also a seal member part 11 that is the lower layer of substrate material part 12 is composed of two layers, i.e., a layer comprising a main seal member 11a and another layer, which is layered on the aforementioned layer, comprising a sub-seal member 11b and a main seal-use adhesive (i.e., a first adhesive) 11c, which are layered on the main seal member 11a. In the upper layer of the seal member part 11, the composition is such that the main seal-use adhesive 11c does not contact with the sub-seal member 11b.

The impedance adjustment part 23 is pre-formed on the sub-seal member 11b by using a printing or etching. Therefore, the impedance adjustment part 23 is fitted into a cut-out area of the substrate material part 12 by attaching the sub-seal member 11b onto the substrate material part 12 so as to make the impedance adjustment part 23 enter the cut-out area of the substrate material part 12. A gap is provided between the impedance adjustment part 23 and substrate material part 12. The gap is provided for easy extraction of the impedance adjustment part 23 from the substrate material part 12 as will be described later.

It is configured such that the contact part between the sub-seal member 11b and substrate material part 12 is provided with a second adhesive (i.e., a sub-seal-use adhesive) 11d which adheres the sub-seal member 11b to the substrate material part 12. Also, between the substrate material part 12 and print member part 13, a layer of a third adhesive 14 which adheres the substrate material part 12 to the print member part 13 is provided.

The RFID tag unit 10 according to the present embodiment is configured such that a part of the antenna 22 (i.e., the part formed on the upward of the cutout part) formed on the impedance adjustment part 23, equipped in the cutout area of the substrate material part 12 and on the substrate material part 12, contacts with the impedance adjustment part 23 so as to be electrically connected. Because of this, a contact resistance is generated in the contact point between the impedance adjustment part 23 and an exposed part 22a of the antenna 22. A value of the contact resistance, however, can be estimated within a certain range, if the materials of the antenna 22 and impedance adjustment part 23 are known. Therefore, forming a pattern of the impedance adjustment part 23 by taking account of the contact resistance makes it possible to suppress a displacement of resonance (i.e., a displacement of a resonance frequency) to the minimum.

Meanwhile, the RFID tag unit 10 is configured to prevent the adhesive 11c from contacting with the sub-seal member 11b, and therefore even if the main seal member 11a is peeled off, the sub-seal member 11b maintains adhesion status to the substrate material part 12 with the adhesive lid, preventing a peeling off.

When separately using the RFID tag unit 10 of the present embodiment by attaching it to nonmetallic goods or such, the main seal member 11a is to be peeled, followed by peeling off the sub-seal member 11b. This action separates the impedance adjustment part 23 from the antenna 22 and cuts the impedance adjustment part cut-off part 30A from the RFID tag unit 10. The present embodiment is configured to provide the gap between the impedance adjustment part 23 and substrate material part 12 as described above and therefore it is possible to easily extract the impedance adjustment part 23 from the cut-out area of the substrate material part 12 when peeling off the sub-seal member 11b.

As described above, the RFID tag unit 10 according to the present embodiment is configured to cut off the impedance adjustment part cutoff part 30A (i.e., the impedance adjustment part 23) from the RFID tag unit 10, thereby making it possible to suppress a displacement of resonance to a minimum and use the RFID tag unit 10 by making it bring out the maximum performance when separately using the RFID tag unit 10 by attaching it to nonmetallic goods or such.

EMBODIMENT 2

Figure 6A:
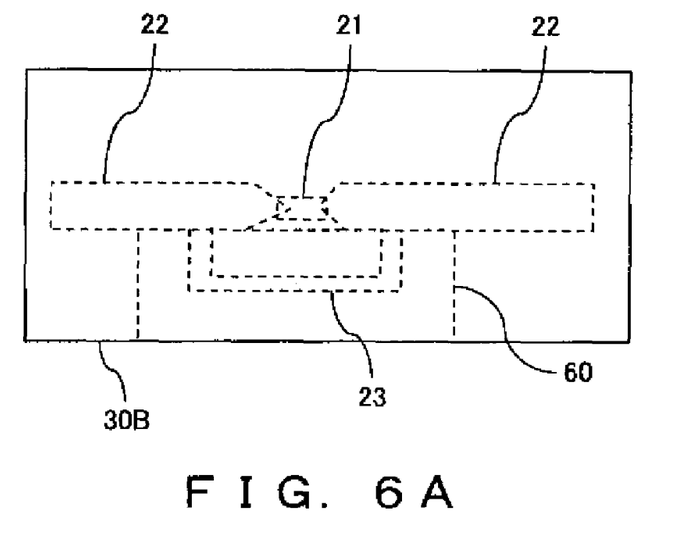
FIGS. 6A and 6B are diagrams showing a second preferred embodiment (i.e., embodiment 2) of a comprisal for cutting off an impedance adjustment part cutoff part.

An RFID tag unit 10 according to a second embodiment is configured to pre-process an impedance adjustment part cut-off part with perforations and cut off it.

Figure 6B:
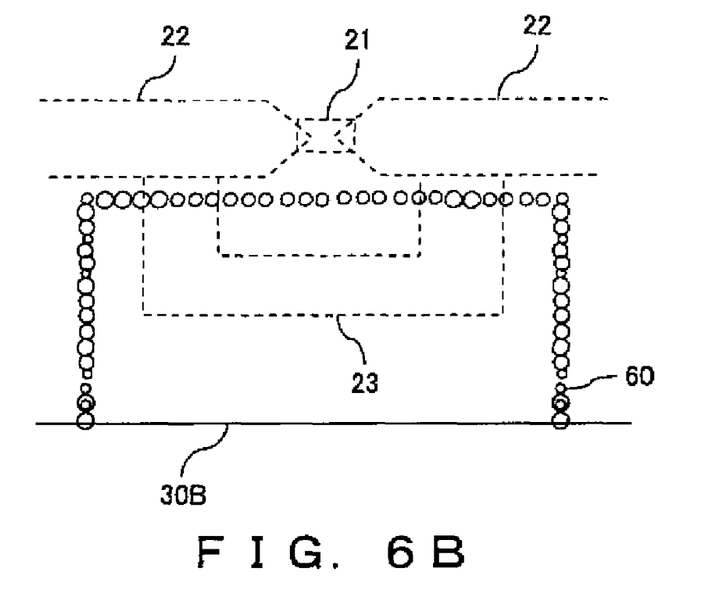

FIGS. 6A and 6B are diagrams showing an RFID tag unit 10 according to the second embodiment of the present invention.

FIG. 6A is a top view showing an overall composition of the RFID tag unit 10 according to the second embodiment.

The RFID tag unit 10 according to the second embodiment is configured to provide an impedance adjustment part cutoff part 30B in a part of a substrate material part 12 positioned under an impedance adjustment part 23 and in a part of a seal member part 11 positioned under the substrate material part 12 as shown in FIG. 6A. The outer frame of the impedance adjustment part cutoff part 30B is formed with perforation line 60.

FIG. 6B is a diagram showing an enlargement of the perforation line 60 of the impedance adjustment part cutoff part 30B. The perforation line 60 is constituted of a plurality of circular holes lining up in a certain interval as shown in FIG. 6B. The perforation line 60 is formed by separating from the antennal 22 by a prescribed distance. The reason is to prevent the antenna 22 from being mistakenly cut off when cutting off the impedance adjustment part cutoff part 30B. Also, the perforation line 60 is formed to the respective ends of the substrate material part 12 and seal member part 11 as shown in FIG. 6B.

The second embodiment of the present invention is configured to allow a cutoff of the impedance adjustment part cutoff part 30B provided on the back side of the RFID tag unit 10 along the perforation line 60, thereby making it possible to easily cut off the impedance adjustment part 23 from the antenna 22.

Figure 7:
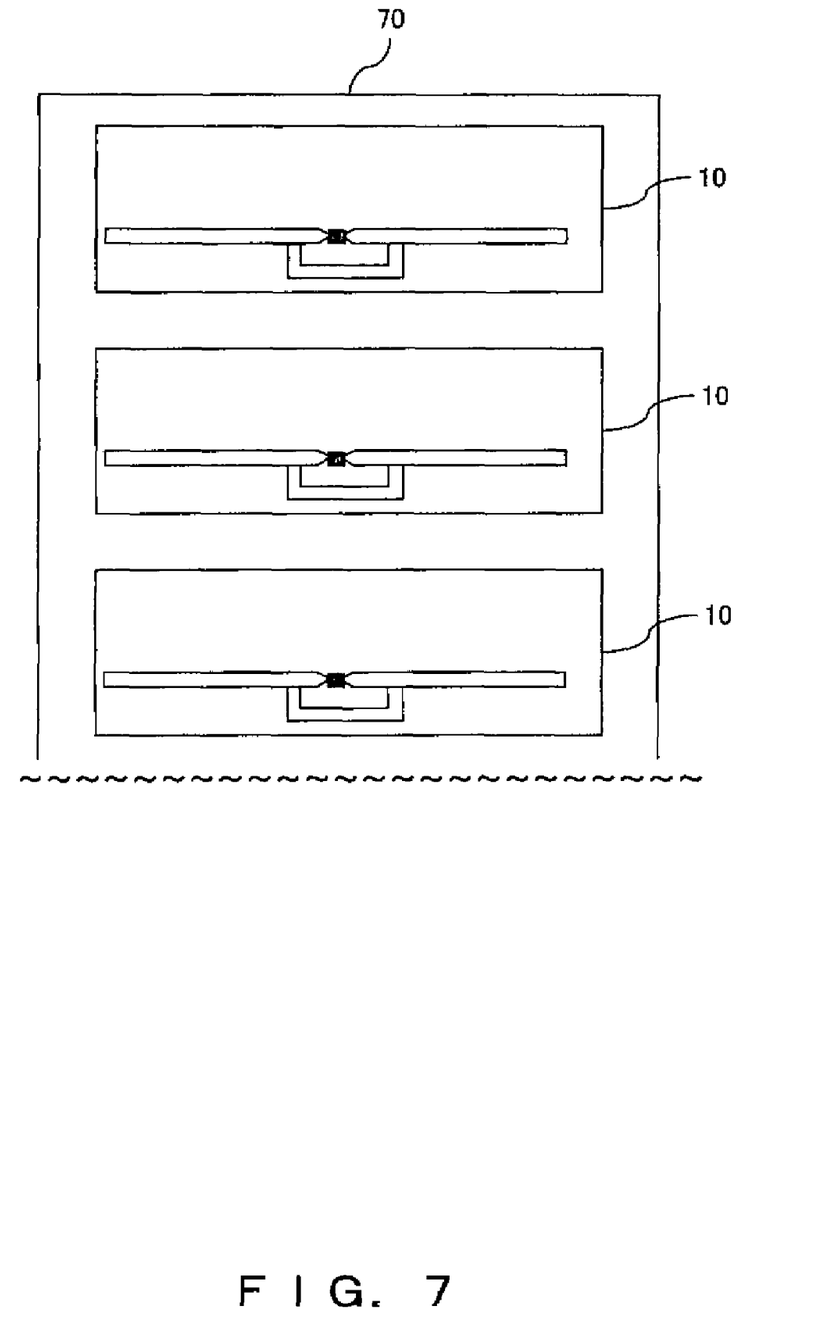
FIG. 7 shows a top view of a label sheet in which an RFID tag unit is produced.

In this execution form, more than one RFID tag 10 is made on label seat 70 as shown in FIG. 7. Since the label sheet 70 is thin, it is possible to apply printing (and issuing) onto the surface of the RFID tag units 10 produced on the label sheet 70 by using a label printer. When using the PET material which processed leuco in this case to print member part 13, the print in the surface in RFID tag unit 10 becomes rewritable and the print and the issue become possible repeatedly many times. Then, placing the printed/issued RFID tag unit 10 and the main seal member 11a overlapped on a metal makes it possible to use an RFID tag constituted of the RFID tag unit 10 and the main seal member 11a as a metal-suitable RFID tag.

Figure 8:
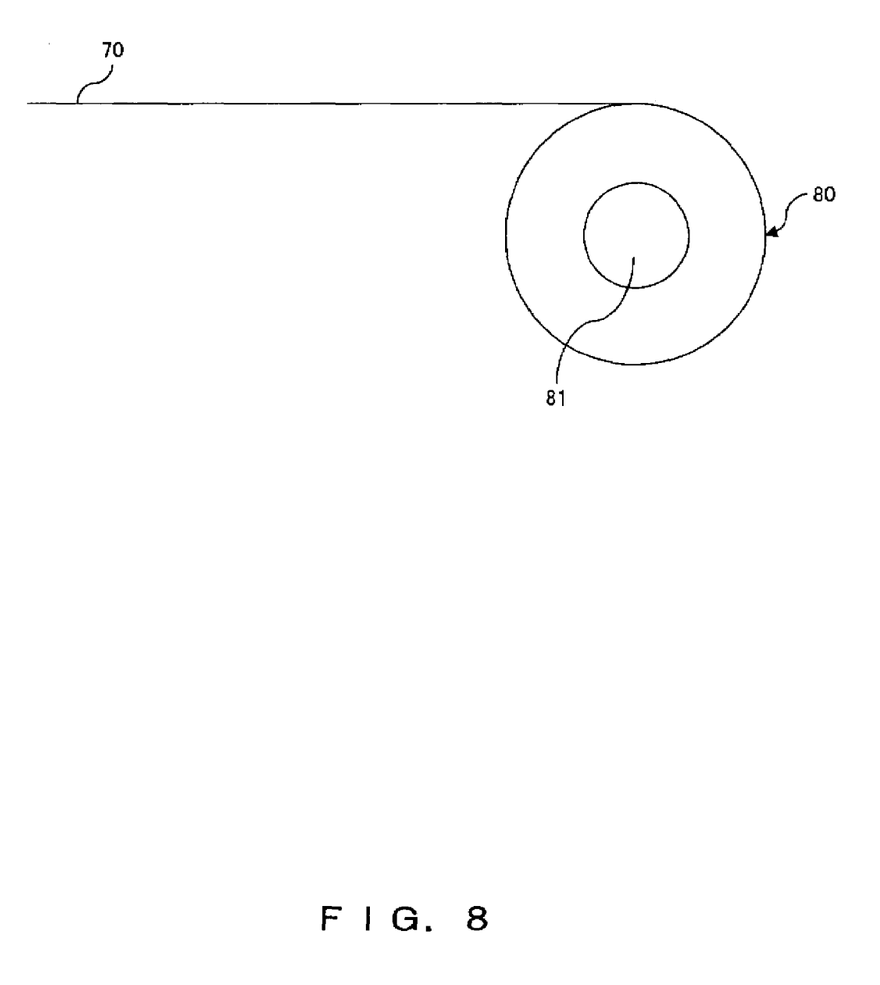
FIG. 8 shows a side view of a roll constituted by the label sheet shown in FIG. 7.

FIG. 8 shows a side view of a roll constituted of the label sheet 70 shown in FIG. 7. The face on the direction indicated by the arrow is the top surface of the label sheet 70 in the showing of FIG. 8.

The roll 80 shown in FIG. 8 is made by winding the label sheet 70 in multitude around a cylindrical core 81 having a cavity around its center. Setting the roll 80 to a label printer enables it to continuously print and issue the RFID tag unit 10.

The metal-suitable RFID tag according to the present invention is constructed to separate a RFID tag unit and a metal sheet part from each other, thereby enabling a printing and issuing of the RFID tag unit by using an RFID tag-use label printer. This makes it possible to greatly improve a work efficiency for printing and issuing the RFID tag unit. Also, an impedance adjustment unit can be cut off from the RFID tag unit. This also enables a simple work process when using the RFID tag unit separately as a nonmetallic goods-use RFID tag. Furthermore, simply attaching a metal sheet part under the RFID tag makes it possible to easily produce a metal-suitable RFID tag. Therefore the production efficiency thereof improves greatly.

The metal-suitable RFID tag according to the present invention is constructed to make it possible to print on and issue an RFID tag unit by using an RFID tag-use label printer and therefore enable a retail business such as a supermarket and convenience store, or a self-owned business, to easily print and issue an RFID tag unit by purchasing an RFID tag-use label printer.

What is claimed is:

1. A metal suitable radio frequency identification (RFID) tag device, comprising:
   a metal sheet part;
   an RFID tag unit formed on the metal sheet part; and
   a metal on the back of the metal sheet part,
   wherein the RFID tag unit comprises:
      a seal material part;
      a substrate material part; and
      a printable material part, wherein the substrate material part comprises an LSI chip, an antenna and an impedance adjustment part connected to the antenna, and the impedance adjustment part includes an impedance adjustment part cutoff part which allows a cutting out of the impedance adjustment part.

2. The RFID tag device according to claim 1, wherein said impedance adjustment part cutoff part is equipped in the substrate material part and seal material part.

3. The RFID tag device according to claim 2, wherein a perforation is formed on said impedance adjustment part cutoff part.

4. The RFID tag device according to claim 2, wherein said impedance adjustment part cutoff part comprises a seal part equipped under said impedance adjustment part.

5. The RFID tag device according to claim 4, wherein said impedance adjustment part is equipped in an area cut off of the substrate material part.

6. The RFID tag device according to claim 5, wherein said seal material part comprises a sub-seal member equipped under said impedance adjustment part, and a main seal member equipped under the sub-seal member and coming into contact with said sub-seal member.

7. The RFID tag device according to claim 6, wherein said sub-seal member comes into contact with the substrate material part.

8. The RFID tag device according to claim 6, wherein a first adhesive member is formed in a layer in which said sub-seal member is formed.

9. The RFID tag device according to claim 8, wherein said sub-seal member is formed so as not to contact with said first adhesive member, said main seal is formed so as to contact with the first adhesive member, and a second adhesive member is formed between the sub-seal member and the substrate material part.

10. The RFID tag device according to claim 5, wherein a gap is provided between said impedance adjustment part and the substrate material part in said cutoff area.

11. The RFID tag device according to claim 6, wherein said impedance adjustment part is formed on said sub-seal.

12. The RFID tag device according to claim 11, wherein said impedance adjustment part is formed on said sub-seal by printing.

13. The RFID tag device according to claim 11, wherein said impedance adjustment part is formed on said sub-seal by etching.

14. A metal-suitable radio frequency identification (RFID) tag, comprising:

an RFID tag device according to claim 1, wherein the metal sheet part comprises a spacer part and a metal reflection part and which is formed on the back of the RFID tag unit.

* * * * *